(12) United States Patent
Marupaduga et al.

(10) Patent No.: US 11,601,837 B1
(45) Date of Patent: Mar. 7, 2023

(54) ADAPTIVE DISTRIBUTION OF CONTENT

(71) Applicant: T-Mobile Innovations LLC, Overland Park, KS (US)

(72) Inventors: Sreekar Marupaduga, Overland Park, KS (US); Hannah J. Sifuentes, Lee's Summit, MO (US); Anurag Thantharate, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/499,839

(22) Filed: Oct. 12, 2021

(51) Int. Cl.
| | |
|---|---|
| *H04W 24/10* | (2009.01) |
| *H04B 17/336* | (2015.01) |
| *H04L 43/0852* | (2022.01) |
| *H04B 17/318* | (2015.01) |
| *H04L 43/0888* | (2022.01) |
| *H04L 67/53* | (2022.01) |

(52) U.S. Cl.
CPC .......... *H04W 24/10* (2013.01); *H04B 17/318* (2015.01); *H04B 17/336* (2015.01); *H04L 43/0852* (2013.01); *H04L 43/0888* (2013.01); *H04L 67/53* (2022.05)

(58) Field of Classification Search
CPC ... H04W 24/10; H04B 17/318; H04B 17/336; H04L 67/53; H04L 43/0852; H04L 43/0888
See application file for complete search history.

(56) References Cited

U.S. PATENT DOCUMENTS 11,175,942 B2 * 11/2021 Ekbote ................ H04L 43/045
2022/0196425 A1 * 6/2022 Xu ....................... G01C 25/005

FOREIGN PATENT DOCUMENTS

WO    WO-2022132151 A1 *  6/2022

* cited by examiner

*Primary Examiner* — Thu V Nguyen
*Assistant Examiner* — Aye M Aung

(57) ABSTRACT

A method of delivering content to a user equipment (UE). The method comprises collecting radio operation data by a monitor application executing on a communication processor of the UE; sending the radio operation data by the monitor application to a data analysis application executing on a computer system; analyzing the data by the data analysis application to determine a device technology of the UE, a history of high throughput radio usage of the UE, a history of medium throughput radio usage of the UE, a history of low throughput radio usage, a history of communication latency, and a history of cell sites the UE attached to; and providing a report on the UE including the device technology of the UE and the history of radio usage of the UE by the computer system to a third party for use in delivering content in a format selected based on the report.

20 Claims, 9 Drawing Sheets

ADAPTIVE DISTRIBUTION OF CONTENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication devices may receive content from various sources in various formats for presentation to a user of the device. Text message content may be sent to the device and presented as a short message service (SMS) message or a text message. Richer content that embeds an image may be sent as a multimedia message service (MMS) message. Video content may be sent to the device for presentation to the user. Augmented reality content may be sent to the device for presentation to the user. Virtual reality content may be sent to the device for presentation to the user.

SUMMARY

In an embodiment, a method of routing and delivering content to a user equipment (UE) is disclosed. The method comprises collecting radio operation data by a monitor application executing on a communication processor of the UE, sending the radio operation data by the monitor application to a client application executing on a general-purpose processor of the UE, and sending the radio operation data by the client application via a wireless communication link to a collector application executing on a computer system. The method further comprises sending the radio operation data by the collector application to a data analysis application executing on the computer system, analyzing the radio operation data by the data analysis application to determine a device technology of the UE, a history of high throughput radio usage of the UE, a history of medium throughput radio usage of the UE, a history of low throughput radio usage of the UE, a history of communication latency, a history of network slice utilization, and a history of cell sites the UE attached to, and analyzing a plurality of network elements involved in providing communication links to the UE to determine a history of data throughput of the network elements, a history of latency of the network elements, and a history of jitter of the network elements by the data analysis application. The method further comprises generating a report on the UE by the computer system including the device technology of the UE, the history of radio usage of the UE and on the history of the network elements, receiving requests by a content distribution application executing on the computer system from a third party to distribute content to the UE, and sending content by the content distribution application to the UE.

In another embodiment, a method of delivering content to a user equipment (UE) is disclosed. The method comprises collecting radio operation data by a monitor application executing on a communication processor of the UE, sending the radio operation data by the monitor application to a client application executing on a general-purpose processor of the UE, and sending the radio operation data by the client application via a wireless communication link to a collector application executing on a computer system. The method further comprises sending the radio operation data by the collector application to a data analysis application executing on the computer system and analyzing the radio operation data by the data analysis application to determine a device technology of the UE, a history of high throughput radio usage of the UE, a history of medium throughput radio usage of the UE, a history of low throughput radio usage of the UE, a history of communication latency, a history of network slice utilization, and a history of cell sites the UE attached to. The method further comprises generating by the computer system a recommended routing rule for delivering content to the UE based on analyzing the radio operation data, wherein the routing rule identifies times for delivering high throughput content, times for delivering medium throughput content, and times for delivering low throughput content and identifies the device technology of the UE and sending the recommended routing rule to a third party for use in delivering content to the UE. The method further comprises, based on the recommended routing rule, based on the device technology of the UE, and based on a current time, selecting a format of a content by the third party and sending the content in the selected format to the UE by the third party.

The method further comprises generating a report on the UE by the computer system including the device technology of the UE, the history of radio usage of the UE and on the history of the network elements, and providing a schedule of the UE capability for presenting content in different formats based on the report on the UE to a third party for use in delivering content in a format selected based on the report.

In yet another embodiment, a method of delivering content to a user equipment (UE) is disclosed. The method comprises collecting radio operation data by a monitor application executing on a communication processor of the UE, sending the radio operation data by the monitor application to a client application executing on a general-purpose processor of the UE, and sending the radio operation data by the client application via a wireless communication link to a collector application executing on a computer system. The method further comprises sending the radio operation data by the collector application to a data analysis application executing on the computer system, analyzing the radio operation data by the data analysis application to determine a device technology of the UE, a history of high throughput radio usage of the UE, a history of medium throughput radio usage of the UE, a history of low throughput radio usage, a history of communication latency, and a history of cell sites the UE attached to, and providing a report on the UE including the device technology of the UE and the history of radio usage of the UE by the computer system to a third party for use in delivering content in a format selected based on the report.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
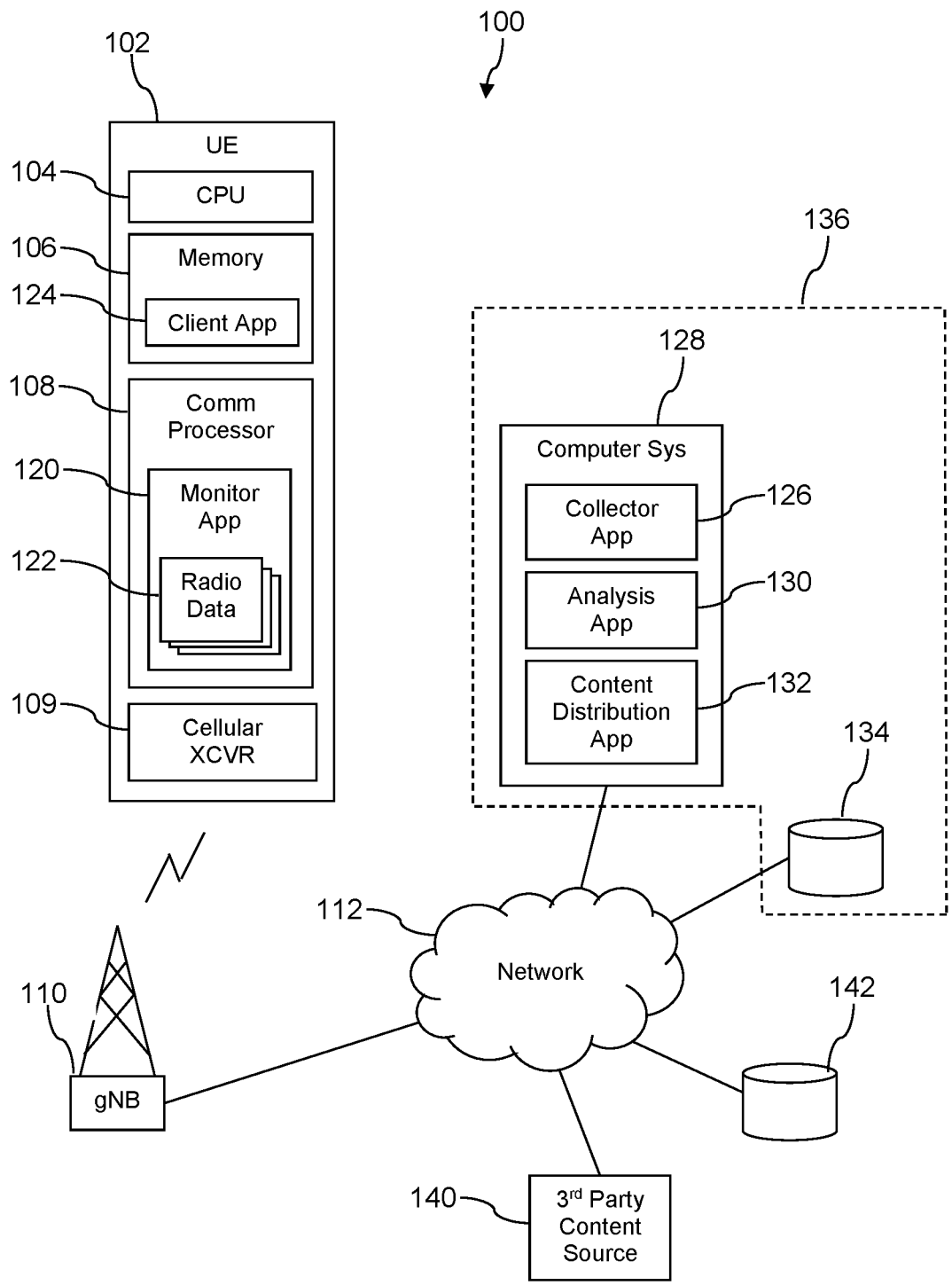
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Content distributors are interested in sending content that is compelling to users of user equipment (UEs), for example mobile phones, smart phones, wearable computers, headset computers, laptop computers, notebook computers, and tablet computers. Content for delivery to UEs are moving towards new formats that are more compelling such as augmented reality (AR) video, virtual reality (VR) video, and interactive video. These compelling formats engage user interests more robustly and persuasively. A problem is that these formats require high quality wireless communication service that isn't always available or that is not always supported by user equipment (UE). Specifically, these formats require low latency and high data throughput. Typically, content distributors and content distribution platforms do not know the limitations of the UEs they may send content to. In some cases, a UE may be a 5G capable device, but at a given moment the UE may be located in a wireless coverage area that only provides 4G coverage. A wireless communication service provider, however, has access to much information that can determine what UE capabilities are and what level of wireless coverage is available to UEs. Providing access to this information can allow a wireless communication service provider to use limited network resources more efficiently (e.g., not use resources sending rich content to a UE which cannot present such rich content advantageously). For example, analytics of UE and/or network conditions can be leveraged to use network resources appropriately for routing appropriately selected content through an effective network path at appropriate times. Part of this involves selecting a form of content that is suitably matched to the capabilities of the UE to receive and present the given form of content. Part of this involves selecting a form of content that is suitably matched to the network capabilities and loading at a time of routing the content. Some of the information that is collected and analyzed is UE location dependent, and this in turn introduces the need to protect subscriber privacy.

The present disclosure teaches using an application or SDK pre-loaded in a systems area or an operating system of the UE that collects radio environment and network key performance indicators (KPIs) experienced by the device and reports this back to a collecting service executing on a computer system stood up directly or indirectly by the wireless communication service provider. A monitor application may be stored and executed in a modem or communication processor of the UE where it can readily monitor changing radio conditions experienced by the UE. The information can include information about location of the UE, time the UE spends in different service bands (high throughput band, middle throughput band, low throughput band), radio key performance indicators (RF KPIs) such as reference signal received power (RSRP) and signal-to-noise ratio (SINR). The location of the UE may be indicated by identities of cell sites that the UE is attached to, where the location of the identified cell site can be used to lookup a location of the cell site that can be used as a proxy for the location of the UE. In some cases, the information can include time the UE spends communicating through different network slices, where the different network slices are associated with different data throughput rates. The monitor application captures the information and hands it off to the SDK; the SDK sends the information to the collector service or collecting application; and the collecting service hands the information off to an analysis application that processes the information to make it suitable for use by others.

There are two ways this processed information can be used to address the problems related to delivering rich content to UEs. The content source can provide content to the wireless communication service provider and define a criteria: deliver the content when the UE is within a predefined proximity of a key location (a premium coffee shop ad content when the UE is close to a premium coffee shop location), when the UE is receiving low latency, high bandwidth coverage. The criteria can also define a device capability or technology. When the criteria are met, the service provider delivers the content. This may be referred to as a content queueing or caching followed by content delivery triggered upon satisfaction of the criteria (e.g., the UE moves into a high-quality coverage area and/or the UE moves into an area proximate a location of interest) approach. Alternatively, the content source can ask for a list of UEs that meet the criteria, and the service provider can provide a list of a plurality of devices (e.g., phone numbers or IP addresses of the devices) that meet the criteria—without, however, providing an identity that is considered PII, that is not trackable to an individual person.

In an embodiment, the content source may delegate the task of selecting a format of the content to be delivered to UEs based on the match of the current network capability of the UE to available different content formats. For example, a first UE is delivered a static picture and a text version of the subject content because it has low network bandwidth at present, a second UE is delivered a simple video version (e.g., a low definition video) of the subject content because it has medium network bandwidth at present, and a third UE is delivered a high definition (HD) video version of the subject content because it has high network bandwidth at present. The evaluation of network bandwidth available to the UE may be based on what network slice the UE is utilizing, because different network slices may be associated with low bandwidth, medium bandwidth, or high bandwidth. To support this functionality, the service provider may analyze the information received from UEs to identity network elements that historically provide low network throughput and other network elements that historically provide high network throughput. This historical information can be used to deliver content accordingly. It may be that this system can provide information to content sources about when high network throughput is generally available, whereby the content sources can better select when to promulgate their content.

In an embodiment, the precise current location of a UE is not determined, but rather a map of its typical locations at typical times is developed (along with similar maps for other UE's so a specific call to the individual UE's is not required but rather it is provided in a list (or content is sent to a list) which indicates it typically will be in a desirable geography or a desirable level of network quality in a general time frame. In this way, the data provides a groomed list meeting generally defined characteristics without intense individual tracking (both for privacy and for time and processor reduction). For example, this may define a group of UEs located in a central business district of a city in the morning drive time on a weekday with network latency and equipment appropriate for augmented reality and/or virtual reality content formats. The service provider network may be queried by content sources to make sure there is not a network issue reducing typical latency and bandwidth—but not individually checking the UEs as the contents are being sent. Possibly even less location specific than that—devices resident in this geographic region which tend to have appropriate connectivity and latency in this general time frame possibly combined with connected to specific network elements in this geographic region which consistently deliver appropriate connectivity and latency in this general time frame. In an embodiment, the service provider may provide information about what cell site and/or the location of the cell site UEs are attached to (the cell site location the UE is attached to is not considered PII).

Turning now to FIG. 1, a communication system 100 is described. In an embodiment, the system 100 comprises a user equipment (UE) 102 comprising a general-purpose processor 104, a non-transitory memory 106, a communication processor 108, and a cellular radio transceiver 109. The UE may be a mobile phone, a smart phone, a personal digital assistant (PDA), a wearable computer, a headset computer, a laptop computer, a notebook computer, or a tablet computer. The communication processor 108 may be a modem processor or a baseband processor. The cellular radio transceiver is configured to establish a wireless communication link with a cell site 110 according to a 5G, a long-term evolution (LTE), a code division multiple access (CDMA), or a global system for mobile communication (GSM) telecommunication protocol. The cell site 110 is able to communicatively couple the UE 102 to a network 112 and therethrough to other communication endpoints communicatively coupled to the network 112. The network 112 comprises one or more public networks, one or more private networks, or a combination thereof.

The communication processor 108 executes a monitor application 120 that collects radio data 122 and stores the radio data 122. While the radio data 122 is illustrated in FIG. 1 as within the monitor application 120, in an embodiment, the radio data 122 may be stored in a memory of the communication processor 108, for example a transitory memory or a non-transitory memory of the communication processor 108. The monitor application 120 may be stored in a non-transitory memory of the communication processor 108. The radio data 122 can include key performance indicators (KPI) related to radio communication between the cellular radio transceiver 109 and cell sites such as cell site 110. The radio data 122 can include data about a reference signal received power (RSRP) at different times. For example, different values of RSRP may be stored as radio data 122 with each different RSRP value indexed by a time and/or with an identity of the cell site to which the cellular radio transceiver 109 was attached to at that time. The radio data 122 can include data about a signal-to-noise radio (SINR) at different times. For example, different values of SINR may be stored as radio data 122 with each different SINR value indexed by a time and/or with an identity of the cell site to which the cellular radio transceiver 109 was attached to at that time. At least some of the radio data 122 may comprise metadata such as a device model and radio technology of the UE 102. The radio data 122 may also include information about what network slices the UE 102 is using at different times. The information about network slices may be used to infer data throughput accessible to the UE 102 at different times. Said in other words, the network slices used by the UE 102 may serve as a proxy for determining a data throughput accessible to the UE 102.

The monitor application 120 may send the collected radio data 122 to a client application 124 stored in a non-transitory portion of the memory 106 that is executed by the general-purpose processor 104. In an embodiment, the client application 124 may be stored in a system portion or a system partition of the non-transitory portion of the memory 106. The monitor application 120 may send radio data 122 to the client application 124 periodically or on an event, for example on the event of the collected radio data 122 exceeding a threshold number of entries or logs. Alternatively, the monitor application 120 may send the radio data 122 to the client application 124 in response to receiving a request from the client application 124. The client application 124 sends the radio data 122 received from the monitor application 120 to a collector application 126 executing on a computer system 128 via the communication links of cellular radio transceiver 109 to the cell site 110, the cell site 110 to the network 112, and the network 112 to the computer system 128.

In an embodiment, the client application 124 may be an application provided on the UE 102 by the wireless communication service provider to provide a variety of subscriber support features independent of the forwarding of radio data 122 to the collector application 126. For example, the client application 124 may support subscribers accessing a application repository or application store provided by the service provider. For example, the client application 124 may support subscribers accessing a subscription account to pay a bill, to add a new line to the account, to buy a new UE, or to reach out to a customer care site. In some contexts, the client application 124 may be referred to as an SDK.

The collector application 126 receives radio data 122 from the UE 102 and possibly a large number of other UEs also subscribed to receive wireless communication service from the service provider. Accordingly, the collector application 126 may act as a portal for receiving and buffering this large volume of radio data 122. In an embodiment, the collector application 126 may store the radio data 122 in a data store 134 for processing by an analysis application 130 that executes on the computer system 128. In an embodiment, the collector application 126 simply stores the radio data 122 in the data store 134 as it is received from the UEs. Alternatively, in an embodiment, the collector application 126 may generate a variety of supplemental data that it attaches to the radio data 122 as received from the UEs. For example, the collector application 126 may add a time and date stamp to record when the radio data 122 was received.

The collector application 126 may add other relevant information to the radio data 122 as well before storing in the data store 134. In an embodiment, the computer system 128 and the data store 134 may be provided by a cloud computing environment 136. For example, the collector application 128 and the analysis application 130 may execute in virtual server resources provided by the cloud computing environment 136, and the data store 134 may be provided as a cloud storage resource in the cloud computing environment 136. Alternatively, the computer system 128 and the data store 134 may be provided in a conventional environment, for example in a data center operated by a wireless communication service provider.

The analysis application 130 may be said to process the radio data 122 stored in the data store 134 to produce actionable information that is stored in the data store 134. Some of the processing may involve determining relevant statistical representations of the radio data 122, for example calculating average values of KPIs during each of a plurality of different time intervals for each UE. The time intervals may be different hours in each of the days of the week. The time intervals may be different 15-minute intervals in each of the days of the week. The analysis application 130 may determine relevant statistics across a plurality of UEs, for example UEs of a same model or capability level, for example UEs attached to the same cell site 110. The analysis application 130 may determine relevant statistics associated with network elements located inside the network 112—for example routers, gateways, and other communication nodes [Inventors: what other specific different network elements can I add to this list? Are these names of network elements still relevant in the context of 5G networks where the network is provided by network functions?].

The actionable information that the analysis application 130 generates based on the radio data 122 stored in the data store 134 may be used to identify a suitable content format that can be advantageously presented by a given UE 102 at a given time and/or in a given location. For example, if the UE 102 has a limited bandwidth connection to the cell site 110 and/or to the network 112, it may not be desirable to send a high definition (HD) video to the UE 102, because the user of the UE 102 may get frustrated and have a negative experience as the subject HD video content falters and balks when pushing a high volume of data content down a low throughput data pipe. It may be more desirable to send a static image and text format content under this circumstance to the UE 102.

In an embodiment, the computer system 128 further executes a content distribution application 132 that receives requests from a third-party content source 140 via the network 112 to send content to the UE 102. The third-party content source 140 may retrieve content from a content data store 142 and send this to the content distribution application 132. Alternatively, the third-party content source 140 may send a request including a reference to the content in the content data store 142 to the content distribution application 132, and the content distribution application 132 uses the reference received in the request to itself fetch the content from the content data store 142. In an embodiment, the content may comprise advertisement content. In an embodiment, the content may comprise public service announcement content. In an embodiment, the content may comprise premium communication service content. In an embodiment, the content may comprise entertainment content.

In an embodiment, the content distribution application 132 is responsible for selecting a format of the designated content to send to the UE 102 (and possibly send to other UEs designated by the request from the third-party content source 140). For example, the content identified in the request may be a generic reference that is associated with differently formatted versions of the content—a virtual reality version of the content, a HD video version of the content, a simple video version of the content, a static image and text version of the content. The content distribution application 132 may evaluate which of the different formats of the referenced content to send to the UE 102 based on the analysis completed by the analysis application 130 (e.g., the "actionable information"). In a first circumstance (the UE 102 is a low capability device), the content distribution application 132 may select the static image and text version of the content and send this formatted content to the UE 102 for presentation. In a second circumstance (the UE 102 is a high capability device and the UE 102 is currently connected to a cell site 110 with a history of providing high data throughput), the content distribution application 132 may select the virtual reality version of the content and send this formatted content to the UE 102 for presentation. The content distribution application 132 can make these decisions based on the history of the radio data provided by the UE 102, for example presume that the UE is in a robust coverage area supporting high data throughput based on the radio data 122 historical analysis rather than determining precisely what the coverage is that the UE 102 is experiencing at that particular time.

In an embodiment, the third-party content source 140 sends the request to the content distribution application 132 including a criteria for sending the content to the UE 102, for example a criteria specifying that the UE 102 is proximate to a particular location and has a particular device capability suitable for presenting the subject content. The content distribution application 132 may enqueue or cache the request and defer sending the subject content until the UE 102 is determined to be proximate to the particular location indicated in the request. In an embodiment, the content distribution application 132 may launch a separate execution thread associated with each pending request that goes to sleep, periodically wakes up and checks the status of the UE 102 associated with a request, determines if the criteria are met, if the criteria are met, sends the designated content to the UE 102, if the criteria are not me, goes back to sleep for a pre-defined interval of time. In an embodiment, the thread may cancel the request after a maximum number of tries or tests or after a maximum period of time such as 24 hours, 36 hours, 2 days, 3 days, a week, or some other period of time.

In an embodiment, the analysis application 130 may provide a digest of the radio data 122 associated with the UE 102 (and other UEs), and the third-party content source 140 may use this digest to decide what content formats to send to the UE 102 directly on its own. The digest may comprise statistics determined based on the radio data 122 of the UE 102 associated with a particular day of the week and a particular time slot, for example a particular hour time interval. The digest may comprise information related to the cell sites 110 that the UE 102 attaches to at different times, for example the locations of the cell sites 110 or identities of the cell sites 110 that the third-party content source 140 can use to map to a general geographical area. This kind of information is customarily deemed NOT personally identifiable information (PII) but rather wireless communication service provider network information.

Figure 2A:
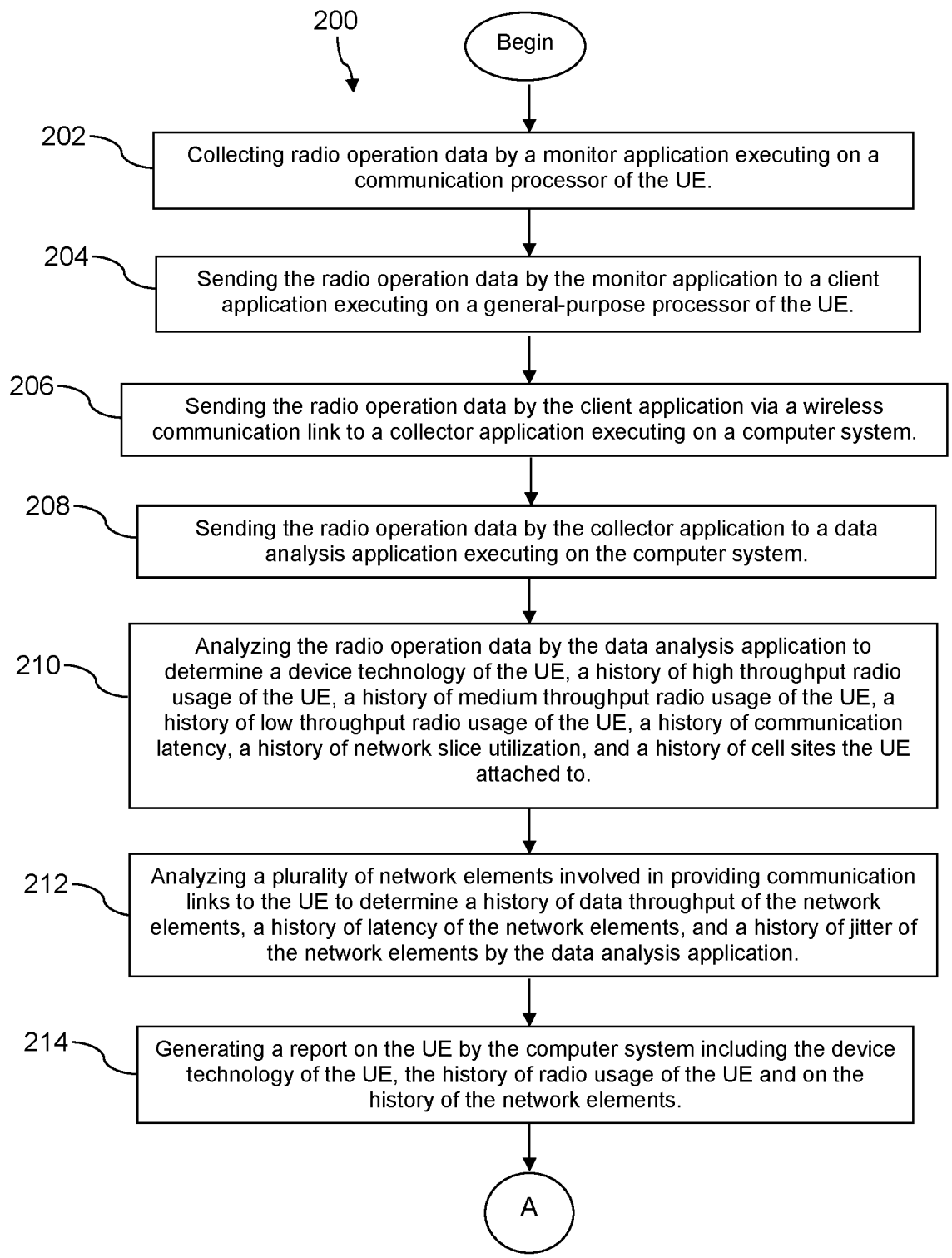
FIG. 2A and FIG. 2B are flow charts of a method according to an embodiment of the disclosure.
Figure 2B:
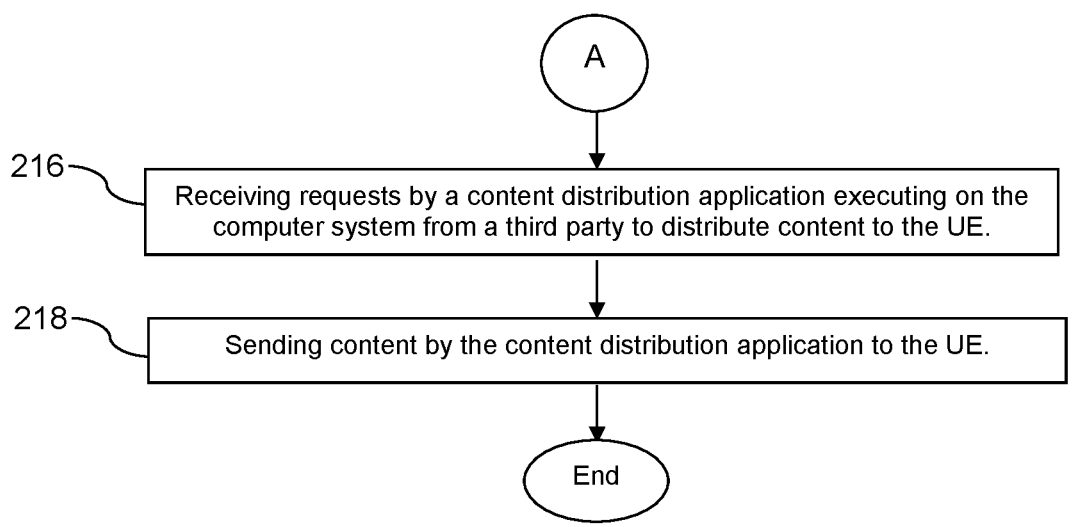

Turning now to FIG. 2A and FIG. 2B, a method 200 is described. In an embodiment, the method 200 is a method of routing and delivering content to a user equipment (UE). At block 202, the method 200 comprises collecting radio operation data by a monitor application executing on a communication processor of the UE. In an embodiment, the UE comprises a mobile phone, a smart phone, a personal digital assistant (PDA), a wearable computer, a headset computer, a laptop computer, a notebook computer, or a tablet computer. In an embodiment, the radio operation data comprises radio communication key performance indicators (KPIs). In an embodiment, the radio operation data comprises reference signal received power (RSRP) radio operation data and signal-to-noise ratio (SINR) radio operation data. In an embodiment, the radio operation data comprises information about usage of network slices by the UE. In an embodiment, the information about usage of network slices comprises time and date stamped information on usage of an enhanced mobile broadband (*eMBB) network slice by the UE, time and data stamped information on usage of a ultra-reliable low latency communications (URLLC) network slice by the UE, and time and date stamped information on usage of a vehicle to everything (V2X) network slice by the UE.

At block 204, the method 200 comprises sending the radio operation data by the monitor application to a client application executing on a general-purpose processor of the UE. At block 206, the method 200 comprises sending the radio operation data by the client application via a wireless communication link to a collector application executing on a computer system. In an embodiment, the wireless communication link is provided according to at least one of a 5G, a long-term evolution (LTE), a code division multiple access (CDMA), or a global system for mobile communication (GSM) telecommunication protocol, for example is provided by the cell site 110 to the cellular radio transceiver 109 of the UE 102. At block 208, the method 200 comprises sending the radio operation data by the collector application to a data analysis application executing on the computer system.

At block 210, the method 200 comprises analyzing the radio operation data by the data analysis application to determine a device technology of the UE, a history of high throughput radio usage of the UE, a history of medium throughput radio usage of the UE, a history of low throughput radio usage of the UE, a history of communication latency of the UE, a history of network slice utilization of the UE, and a history of cell sites the UE attached to. The analysis of radio operation data to determine the history of high throughput radio usage, the history of medium throughput radio usage, and the history of low throughput radio usage by the device may be based on determining and analyzing "time on band." Said in other words, the analysis of radio operation data to determine the histories of throughput of radio usage by the device may be based, at least in part, on analyzing frequency bands and/or channels assigned to the device over time. In an embodiment, the radio operation data is analyzed to determine a history of 5G communication protocol usage. In an embodiment, the radio operation data is analyzed to determine a history of 4 G communication protocol usage. In an embodiment, analyzing the radio operation data comprises determining a history of cell sites that the UE attaches to and wherein generating the report on the UE comprises a history of locations of the cell sites the UE attaches to, wherein the locations of the cell sites are a proxy for a location of the UE. At block 212, the method 200 comprises analyzing a plurality of network elements involved in providing communication links to the UE to determine a history of data throughput of the network elements, a history of latency of the network elements, and a history of jitter of the network elements by the data analysis application. In an embodiment, the network elements comprise routers and gateways. In an embodiment, the processing of blocks 210 and 212 may be said to identify and/or analyze device or UE related information and network related information and to analyze all that information in an integrated way.

At block 214, the method 200 comprises generating a report on the UE by the computer system including the device technology of the UE, the history of radio usage of the UE and on the history of the network elements. At block 216, the method 200 comprises receiving requests by a content distribution application executing on the computer system from a third party to distribute content to the UE.

At block 218, the method 200 comprises sending content by the content distribution application to the UE. In an embodiment, the method 200 further comprises determining a format of the content to be sent to the UE from a plurality of different available formats of the content based on the report. In an embodiment, the different available formats of the content comprise a static picture format, a text format, a low definition (LD) video format, a high definition (HD) video format, an augmented reality (AR) format, and a virtual reality (VR) format. The determining of the format of the content may be performed by the computer system, for example by the content distribution application 132. The determining of the format of the content may be performed by the third-party, for example by the third-party content source 140 based on having received a copy of the report on the UE (and many other UEs) from the computer system.

In an embodiment, the request received from the third-party comprises at least one criterium defining a condition for sending the content by the content distribution application to the UE; and the method 200 further comprises queueing the content by the computer system before sending the content to the UE; periodically determining by the computer system if the at least one criterium is satisfied before sending the content to the UE; and determining that the criterium is satisfied, wherein sending the content by the content distribution application to the UE is triggered based on determining the at least one criterium is satisfied. In this sense at least, the method 200 may be considered to be in part a method of routing content. In an embodiment, the at least one criterium comprises a location criterium, a wireless link data throughput criterium, or a wireless link latency criterium. In an embodiment, the at least one criterium comprises a network element data throughput criterium, a network element latency criterium, or a network element percent utilization criterium.

In an embodiment, the processing of blocks 216 and 218 described above do not happen, and the method 200 comprises providing a schedule of the UE capability for presenting content in different formats based on the report on the UE to the third-party for use in delivering content in a format selected based on the report. Said in other words, in an embodiment the computer system sends the schedule of UE capability to the third-party, and the third-party itself decides what content and/or format of content to send to the UE based on the schedule of UE capability and itself sends the content directly to the UE without routing the content through the computer system and/or the wireless communication service provider. In an embodiment, the analyzing the radio operation data of block 210 comprises determining a history of cell sites that the UE attaches to and wherein generating the report on the UE comprises a history of locations of the cell sites the UE attaches to, wherein the locations of the cell sites are a proxy for a location of the UE. In an embodiment, the schedule of UE capability comprises a map of typical locations of the UE at typical times.

In an embodiment, the processing of blocks 216 and 218 described above do not happen, and the method 200 comprises providing a report on the UE including the device technology of the UE and the history of radio usage of the UE by the computer system to the third-party for use in delivering content in a format selected based on the report. Said in other words, in an embodiment the computer system sends the report on the UE and the device technology of the UE to the third-party, and the third-party itself decides what content and/or format of content to send to the UE based on the report and itself sends the content directly to the UE without routing the content through the computer system and/or the wireless communication service provider. In an embodiment, the processing of method 200 comprising receiving a request from the third-party for a list of UEs that meet a criteria specified in the request, wherein the analysis of the radio operation data indicates that the UE meets the criteria, and wherein the report provided to the third-party comprises history of radio usage of other UEs that also meet the criteria specified in the request.

In an embodiment, method 200 may comprise generating by the computer system a recommended routing rule for delivering content to the UE based on analyzing the radio operation data, wherein the routing rule identifies times for delivering high throughput content, times for delivering medium throughput content, and times for delivering low throughput content and identifies the device technology of the UE.

The method 200 may further comprise sending the recommended routing rule to a third party for use in delivering content to the UE and, based on the recommended routing rule, based on the device technology of the UE, and based on a current time, selecting a format of a content by the third party and sending the content in the selected format to the UE by the third party. In an embodiment, analyzing the radio operation data comprises determining a history of cell sites that the UE attaches to and wherein the recommended routing rule identifies locations of the cell sites the UE attaches to and when the UE attaches to them, wherein the locations of the cell sites are a proxy for a location of the UE. In an embodiment, the recommended routing rule comprises a map of typical locations of the UE at typical times.

Figure 3:
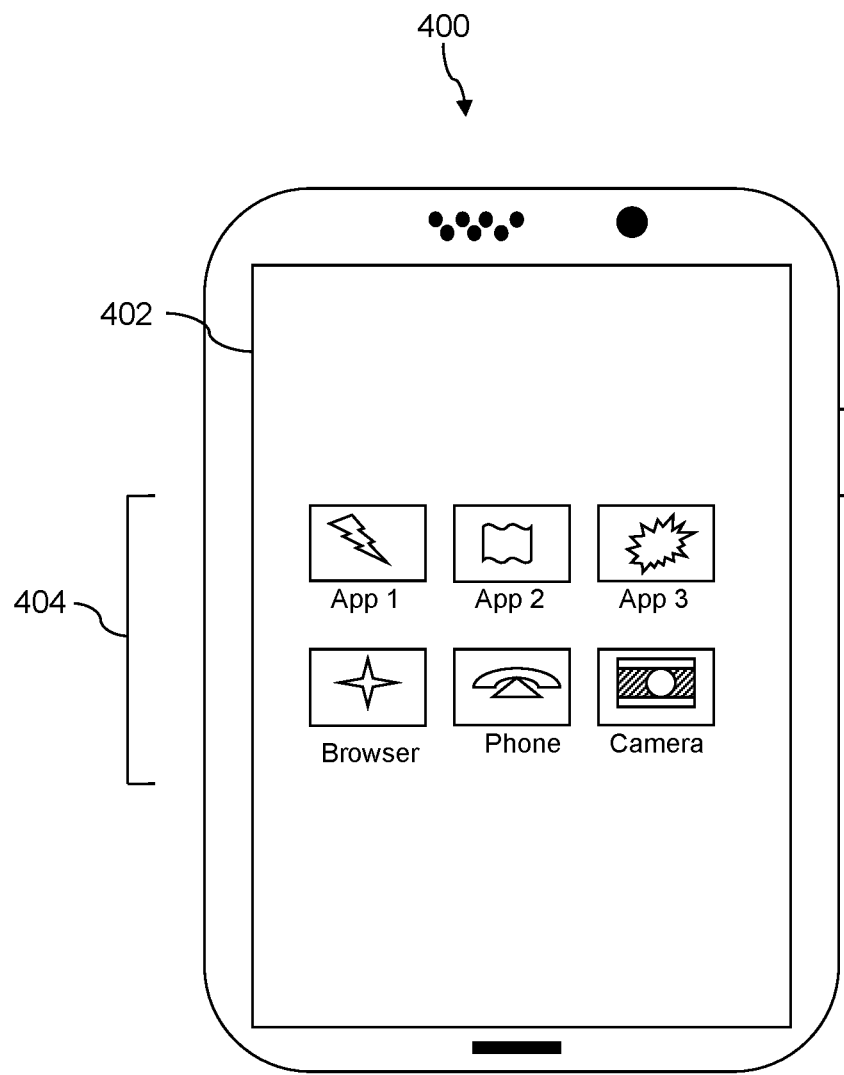
FIG. 3 is an illustration of a handset according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
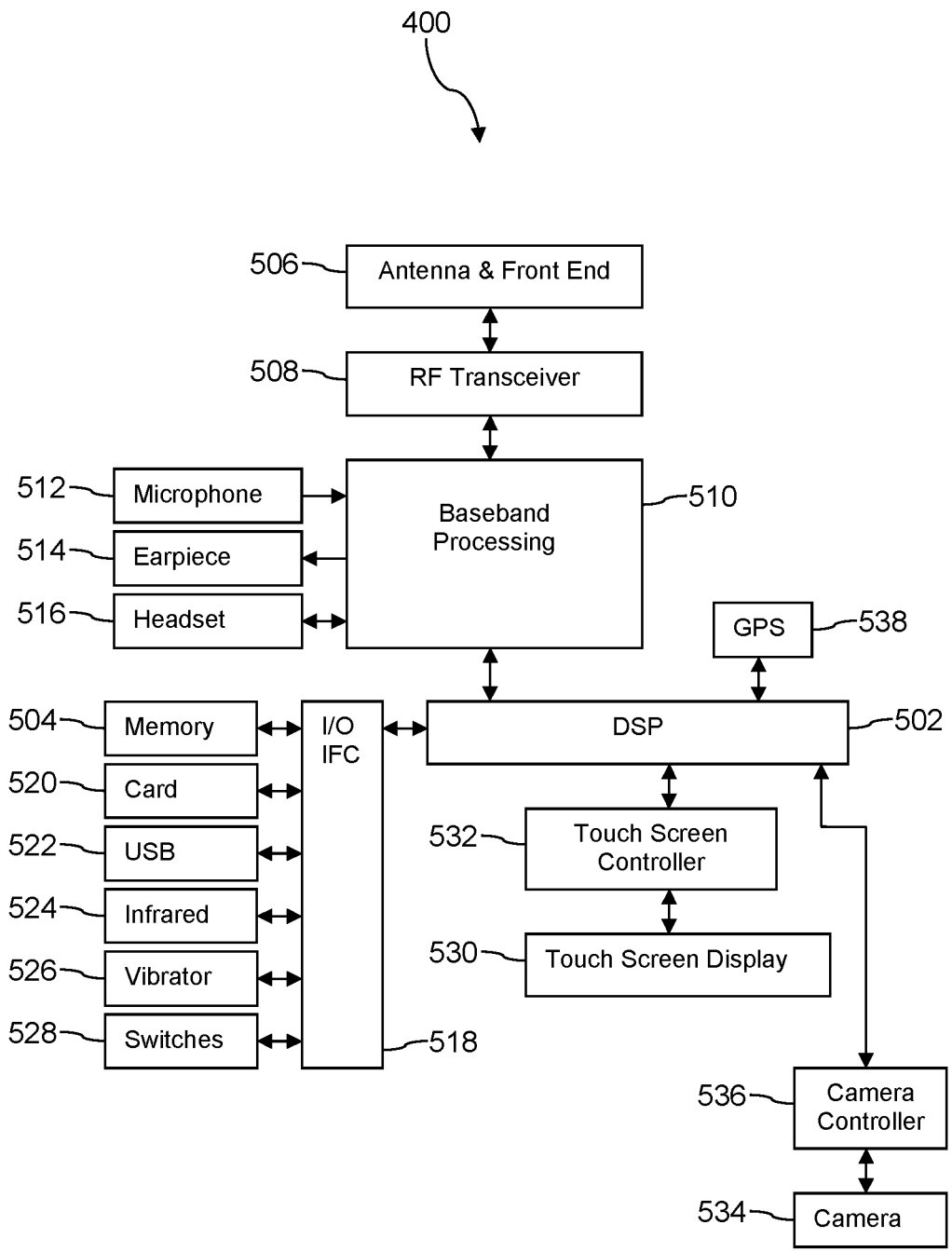
FIG. 4 is a block diagram of a hardware architecture for a user equipment (UE) according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
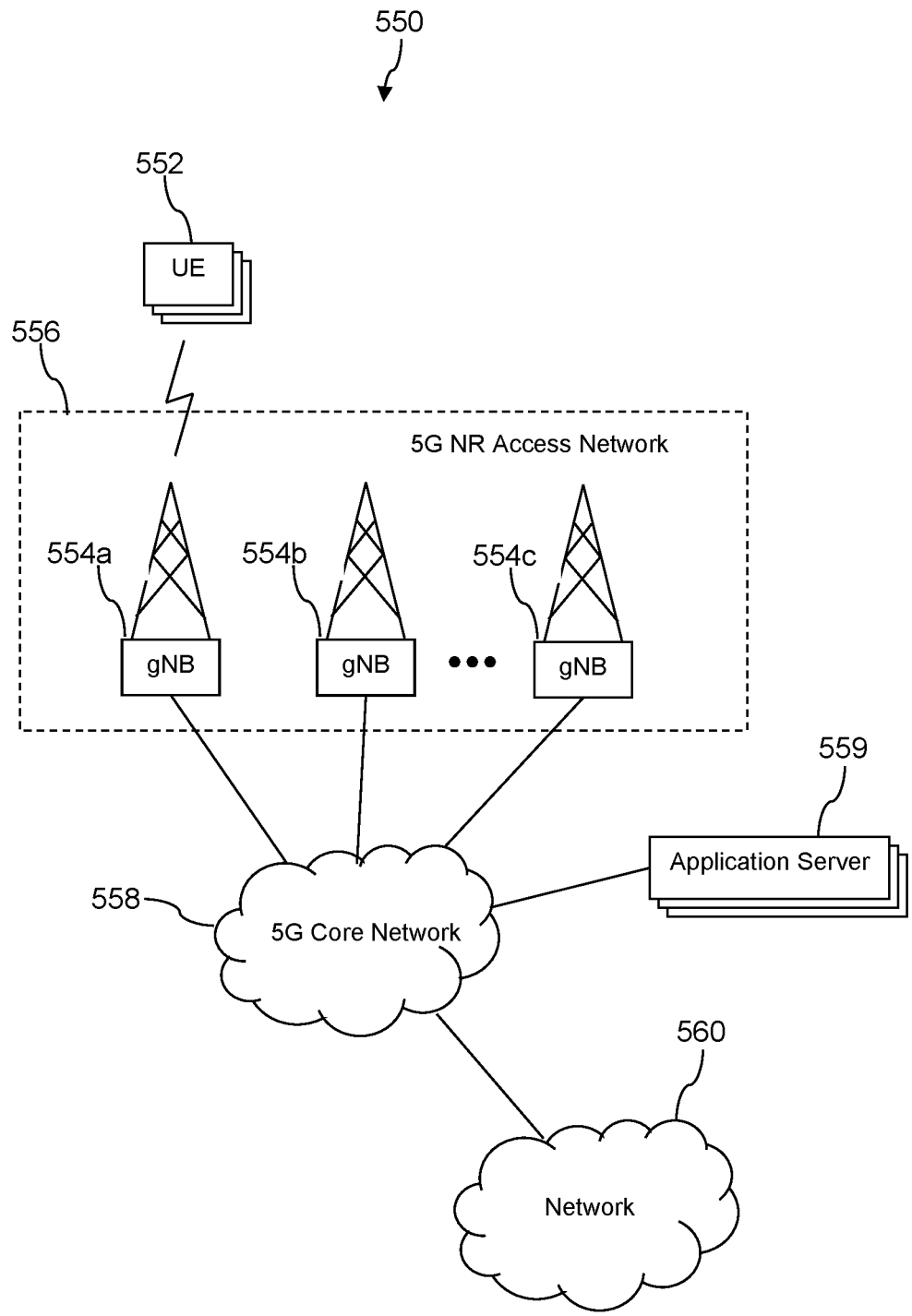
FIG. 5A and FIG. 5B are block diagrams of a 5G network architecture according to an embodiment of the disclosure.

Turning now to FIG. 5A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and sub-carrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
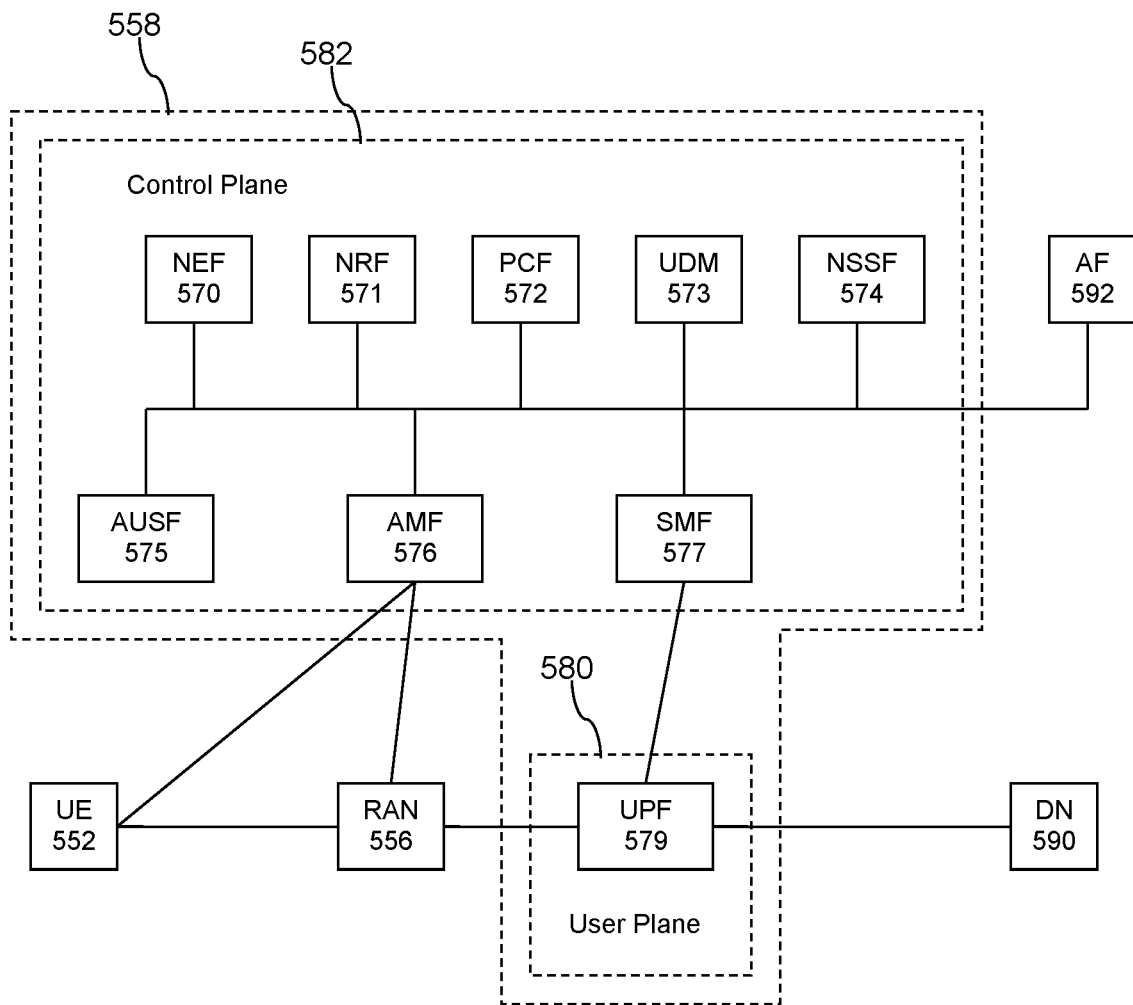

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6A:
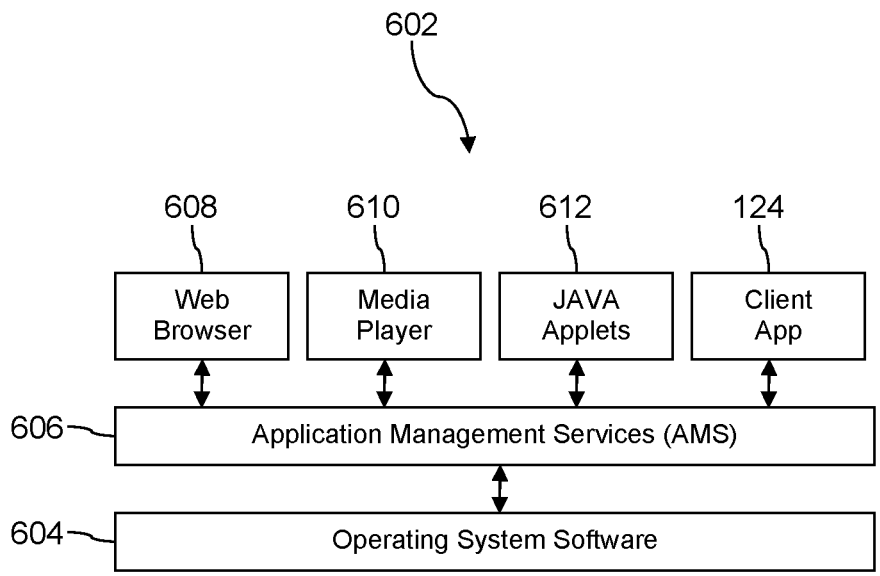
FIG. 6A is a block diagram of a software architecture according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, JAVA applets 612, and the client application 124 (described above with reference to FIG. 1). The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
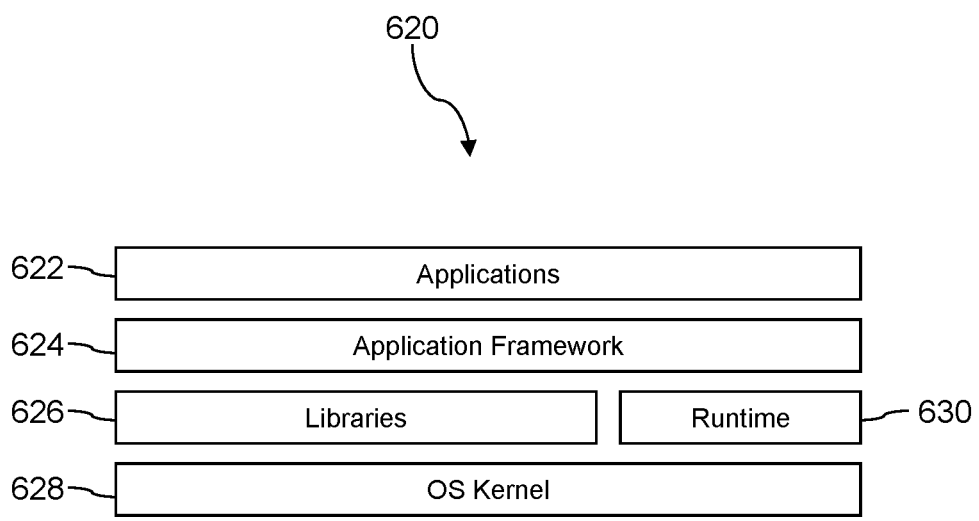
FIG. 6B is a block diagram of another software architecture according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
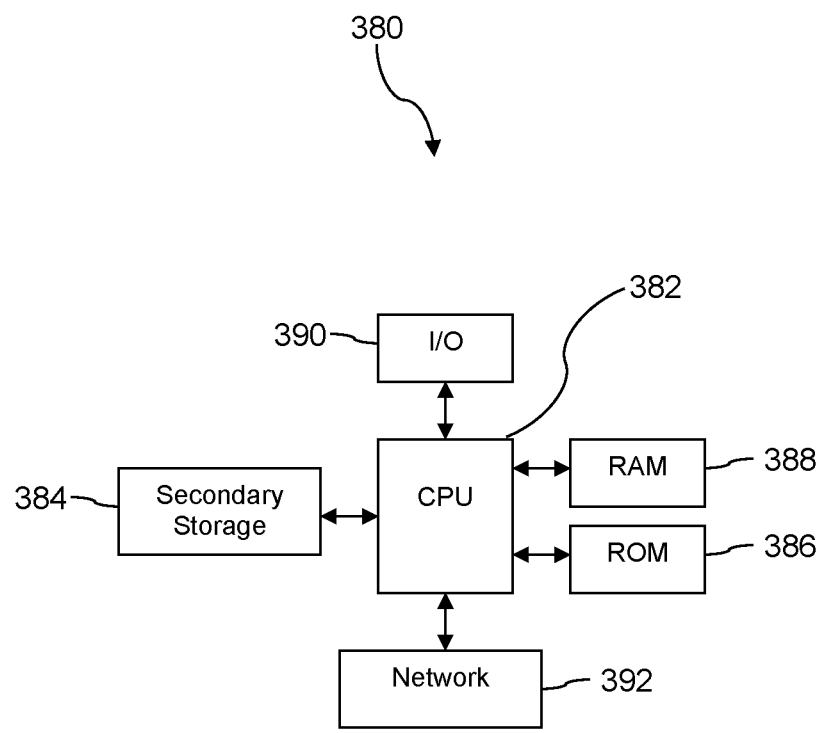
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of routing and delivering content to a user equipment (UE), comprising:
    collecting radio operation data by a monitor application executing on a communication processor of the UE;
    sending the radio operation data by the monitor application to a client application executing on a general-purpose processor of the UE;
    sending the radio operation data by the client application via a wireless communication link to a collector application executing on a computer system;

sending the radio operation data by the collector application to a data analysis application executing on the computer system;

analyzing the radio operation data by the data analysis application to determine a device technology of the UE, a history of high throughput radio usage of the UE, a history of medium throughput radio usage of the UE, a history of low throughput radio usage of the UE, a history of communication latency, a history of network slice utilization, and a history of cell sites the UE attached to;

analyzing a plurality of network elements involved in providing communication links to the UE to determine a history of data throughput of the network elements, a history of latency of the network elements, and a history of jitter of the network elements by the data analysis application;

generating a report on the UE by the computer system including the device technology of the UE, the history of radio usage of the UE, and on the history of the network elements;

generating by the computer system a recommended routing rule for delivering content to the UE based on analyzing the radio operation data, wherein the routing rule identifies times for delivering high throughput content, times for delivering medium throughput content, and times for delivering low throughput content and identifies the device technology of the UE;

sending the recommended routing rule to a third party for use in delivering content to the UE;

based on the recommended routing rule, based on the device technology of the UE, and based on a current time, selecting a format of a content by the third party and sending the content in the selected format to the UE by the third party;

receiving requests by a content distribution application executing on the computer system from the third party to distribute content to the UE; and sending at least one content by the content distribution application to the UE.

2. The method of claim 1, further comprising determining a format of the content to be sent to the UE from a plurality of different available formats of the content based on the report.

3. The method of claim 2, wherein the different available formats of the content comprise a static picture format, a text format, a low definition (LD) video format, a high definition (HD) video format, an augmented reality (AR) format, and a virtual reality (VR) format.

4. The method of claim 1, wherein the requests received from the third party comprise at least one criterium defining a condition for sending the at least one content by the content distribution application to the UE and further comprising:

queueing the at least one content by the computer system before sending the at least one content to the UE;

periodically determining by the computer system if the at least one criterium is satisfied before sending the at least one content to the UE; and determining that the criterium is satisfied, wherein sending the at least one content by the content distribution application to the UE is triggered based on determining the at least one criterium is satisfied.

5. The method of claim 4, wherein the at least one criterium comprises a location criterium, a wireless link data throughput criterium, or a wireless link latency criterium.

6. The method of claim 4, wherein the at least one criterium comprises a network element data throughput criterium, a network element latency criterium, or a network element percent utilization criterium.

7. The method of claim 1, wherein the radio operation data comprises radio communication key performance indicators (KPIs).

8. The method of claim 1, wherein the radio operation data comprises reference signal received power (RSRP) radio operation data and signal-to-noise ratio (SINR) radio operation data.

9. A method of routing and delivering content to a user equipment (UE), comprising:

collecting radio operation data by a monitor application executing on a communication processor of the UE;

sending the radio operation data by the monitor application to a client application executing on a general-purpose processor of the UE;

sending the radio operation data by the client application via a wireless communication link to a collector application executing on a computer system;

sending the radio operation data by the collector application to a data analysis application executing on the computer system;

analyzing the radio operation data by the data analysis application to determine a device technology of the UE, a history of high throughput radio usage of the UE, a history of medium throughput radio usage of the UE, a history of low throughput radio usage of the UE, a history of communication latency, a history of network slice utilization of the UE, and a history of cell sites the UE attached to;

generating by the computer system a recommended routing rule for delivering content to the UE based on analyzing the radio operation data, wherein the routing rule identifies times for delivering high throughput content, times for delivering medium throughput content, and times for delivering low throughput content and identifies the device technology of the UE;

sending the recommended routing rule to a third party for use in delivering content to the UE; and based on the recommended routing rule, based on the device technology of the UE, and based on a current time, selecting a format of a content by the third party and sending the content in the selected format to the UE by the third party.

10. The method of claim 9, wherein analyzing the radio operation data comprises determining a history of cell sites that the UE attaches to and wherein the recommended routing rule identifies locations of the cell sites the UE attaches to and when the UE attaches to them, wherein the locations of the cell sites are a proxy for a location of the UE.

11. The method of claim 10, wherein the recommended routing rule comprises a map of typical locations of the UE at typical times.

12. The method of claim 9, wherein the history of network slice utilization of the UE is an indication of network resource availability captured by the monitor application.

13. The method of claim 9, wherein the UE comprises a mobile phone, a smart phone, a personal digital assistant (PDA), a wearable computer, a headset computer, a laptop computer, a notebook computer, or a tablet computer.

14. The method of claim 9, wherein the wireless communication link is provided according to at least one of a 5G, a long-term evolution (LTE), a code division multiple access (CDMA), or a global system for mobile communication (GSM) telecommunication protocol.

15. A method of delivering content to a user equipment (UE), comprising:
- collecting radio operation data by a monitor application executing on a communication processor of the UE;
- sending the radio operation data by the monitor application to a client application executing on a general-purpose processor of the UE;
- sending the radio operation data by the client application via a wireless communication link to a collector application executing on a computer system;
- sending the radio operation data by the collector application to a data analysis application executing on the computer system;
- analyzing the radio operation data by the data analysis application to determine a device technology of the UE, a history of high throughput radio usage of the UE, a history of medium throughput radio usage of the UE, a history of low throughput radio usage of the UE, a history of communication latency, and a history of cell sites the UE attached to;
- providing a report on the UE including the device technology of the UE and the history of radio usage of the UE by the computer system to a third party for use in delivering content in a format selected based on the report;
- generating by the computer system a recommended routing rule for delivering content to the UE based on analyzing the radio operation data, wherein the routing rule identifies times for delivering high throughput content, times for delivering medium throughput content, and times for delivering low throughput content and identifies the device technology of the UE;
- sending the recommended routing rule to the third party for use in delivering content to the UE; and
- based on the recommended routing rule, based on the device technology of the UE, and based on a current time, selecting a format of a content by the third party and sending the content in the selected format to the UE by the third party.

16. The method of claim 15, wherein the radio operation data comprises information about usage of network slices by the UE.

17. The method of claim 16, wherein the information about usage of network slices comprises time and date stamped information on usage of an enhanced mobile broadband (eMBB) network slice by the UE, time and data stamped information on usage of a ultra-reliable low latency communications (URLLC) network slice by the UE, and time and date stamped information on usage of a vehicle to everything (V2X) network slice by the UE.

18. The method of claim 15, wherein generating the report on the UE comprises a history of locations of the cell sites the UE attaches to, and wherein the locations of the cell sites are a proxy for a location of the UE.

19. The method of claim 15, further comprising receiving a request from the third party for a list of UEs that meet a criteria specified in the request, wherein the analysis of the radio operation data indicates that the UE meets the criteria, and wherein the report provided to the third party comprises history of radio usage of other UEs that also meet the criteria specified in the request.

20. The method of claim 15, wherein the UE comprises a mobile phone, a smart phone, a personal digital assistant (PDA), a wearable computer, a headset computer, a laptop computer, a notebook computer, or a tablet computer.

* * * * *